(12) United States Patent
Nakamura et al.

(10) Patent No.: US 11,104,375 B2
(45) Date of Patent: Aug. 31, 2021

(54) ROTARY ELECTRIC MACHINE CONTROL DEVICE AND ELECTRIC POWER STEERING APPARATUS USING THE SAME

(71) Applicant: DENSO CORPORATION, Kariya (JP)

(72) Inventors: Kouichi Nakamura, Kariya (JP); Nobuyori Nakazima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/835,844

(22) Filed: Mar. 31, 2020

(65) Prior Publication Data

US 2020/0317258 A1 Oct. 8, 2020

(30) Foreign Application Priority Data

Apr. 2, 2019 (JP) .............................. JP2019-070456

(51) Int. Cl.
*B62D 5/04* (2006.01)
*H02P 27/06* (2006.01)
*H02P 25/024* (2016.01)
*H02P 25/22* (2006.01)
*H02P 29/024* (2016.01)

(52) U.S. Cl.
CPC .......... *B62D 5/0463* (2013.01); *H02P 25/024* (2016.02); *H02P 25/22* (2013.01); *H02P 27/06* (2013.01); *H02P 29/024* (2013.01); *B62D 5/0412* (2013.01)

(58) Field of Classification Search
None
See application file for complete search history.

(56) References Cited

U.S. PATENT DOCUMENTS

| 2019/0363664 | A1* | 11/2019 | Nakamura | ........... | B62D 5/0493 |
| 2020/0307682 | A1* | 10/2020 | Fujita | .................. | H02K 11/215 |
| 2020/0317258 | A1* | 10/2020 | Nakamura | ............. | H02P 29/024 |
| 2020/0321769 | A1* | 10/2020 | Nakamura | ............. | B62D 5/046 |

FOREIGN PATENT DOCUMENTS

JP 2018-129996 A 8/2018

* cited by examiner

*Primary Examiner* — Bentsu Ro
(74) *Attorney, Agent, or Firm* — Maschoff Brennan

(57) ABSTRACT

A rotary electric machine control device is provided to control a motor having motor winding sets and includes a plurality of inverter circuits and a plurality of control circuits capable of mutual communication. The inverter circuits switch over the current supply to the motor winding sets. The control circuits include driver control sections, which control the inverter circuits provided correspondingly, and abnormality monitor sections, which monitor the abnormality. The abnormality monitor sections monitor the abnormality of the own system and the other system based on the plurality of abnormality information. The driver control sections change a control mode according to the abnormal state. It is thus possible to control the driving of the motor appropriately based on the abnormality state.

18 Claims, 9 Drawing Sheets

ROTARY ELECTRIC MACHINE CONTROL DEVICE AND ELECTRIC POWER STEERING APPARATUS USING THE SAME

CROSS REFERENCE TO RELATED APPLICATION

The present application claims the benefit of priority from Japanese Patent Application No. 2019-070456 filed on Apr. 2, 2019. The entire disclosures of the above application are incorporated herein by reference.

FIELD

The present disclosure relates to a rotary electric machine control device and an electric power steering apparatus using the same.

BACKGROUND

A conventional rotary electric machine control device is configured to control a rotary electric machine by acquiring power supply relay information related to a power supply relay of other system and monitoring an operation state of the other system.

The conventional rotary electric machine control device determines a driving mode by monitoring the operation state of the other system based on the power supply relay information of the other system.

SUMMARY

According to the present disclosure, a rotary electric machine control device for controlling driving of a rotary electric machine comprises a plurality of inverter circuits for switching over current supply to the rotary electric machine, and a plurality of control circuits. Each control circuit includes a driver control section provided for controlling an inverter circuit, and an abnormality monitor section for monitoring an abnormality. The control circuits are capable of mutual communication. The plurality of inverter circuits and the plurality of control circuits are connected to form a plurality of systems in combination, respectively. One of the plurality of systems forms an own system and another one of the plurality of systems forms an other system.

DETAILED DESCRIPTION OF THE EMBODIMENT

Embodiment

Figure 1:
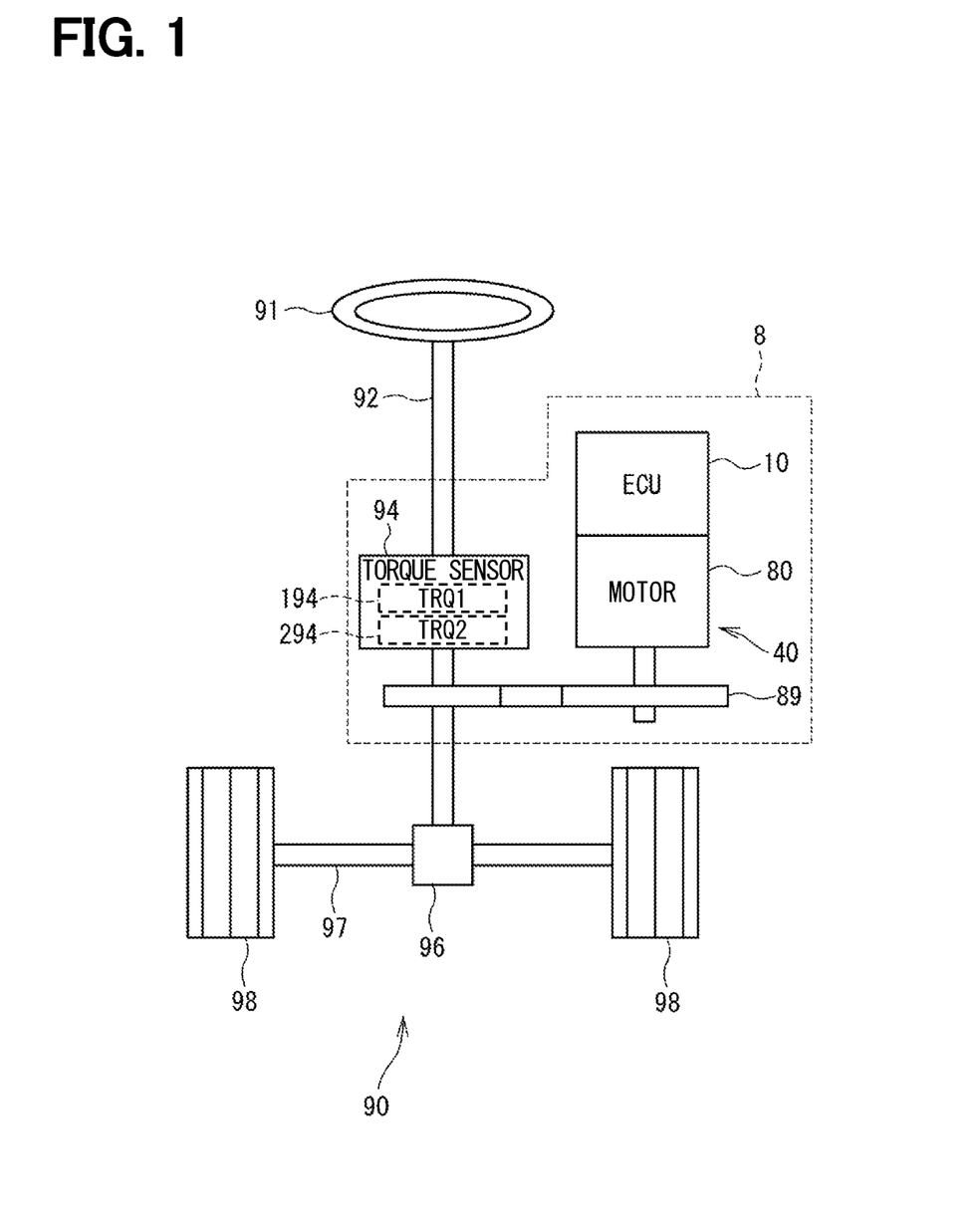
FIG. 1 is a schematic structural diagram showing a steering system including a rotary electric machine control device according to an embodiment.

One embodiment is shown in FIG. 1 to FIG. 10. As shown in FIG. 1, an ECU (electronic control unit) 10 serving as a rotary electric machine control device is provided to control driving of a motor 80 that is a rotary electric machine, and is used together with the motor 80 as an electric power steering apparatus 8 for assisting a steering operation of a vehicle.

The electric power steering apparatus 8 is provided as a part of a steering system 90 of a vehicle. The steering system 90 includes a steering wheel 91 which is a steering member, a steering shaft 92, a pinion gear 96, a rack shaft 97 and road wheels 98 in addition to the electric power steering apparatus 8.

The steering wheel 91 is connected to the steering shaft 92. A torque sensor 94 is provided on the steering shaft 92 to detect a steering torque. The torque sensor 94 has a first sensor element 194 and a second sensor element 294. Each sensor element is capable of detecting its own failure. The pinion gear 96 is provided at an axial end of the steering shaft 92. The pinion gear 96 meshes with the rack shaft 97. The road wheels 98 are coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The road wheels 98 are steered to an angle corresponding to the displacement amount of the rack shaft 97.

The electric power steering apparatus 8 includes the motor 80, a reduction gear 89, the ECU 10 and the like. The reduction gear 89 is a power transmission mechanism that reduces the rotation of the motor 80 and transmits the reduced rotation to the steering shaft 92. The electric power steering apparatus 8 of the present embodiment is a column assist type. It may alternatively be a rack assist type that transmits the rotation of the motor 80 to the rack shaft 97. In the present embodiment, the steering shaft 92 is a driven object.

Figure 2:
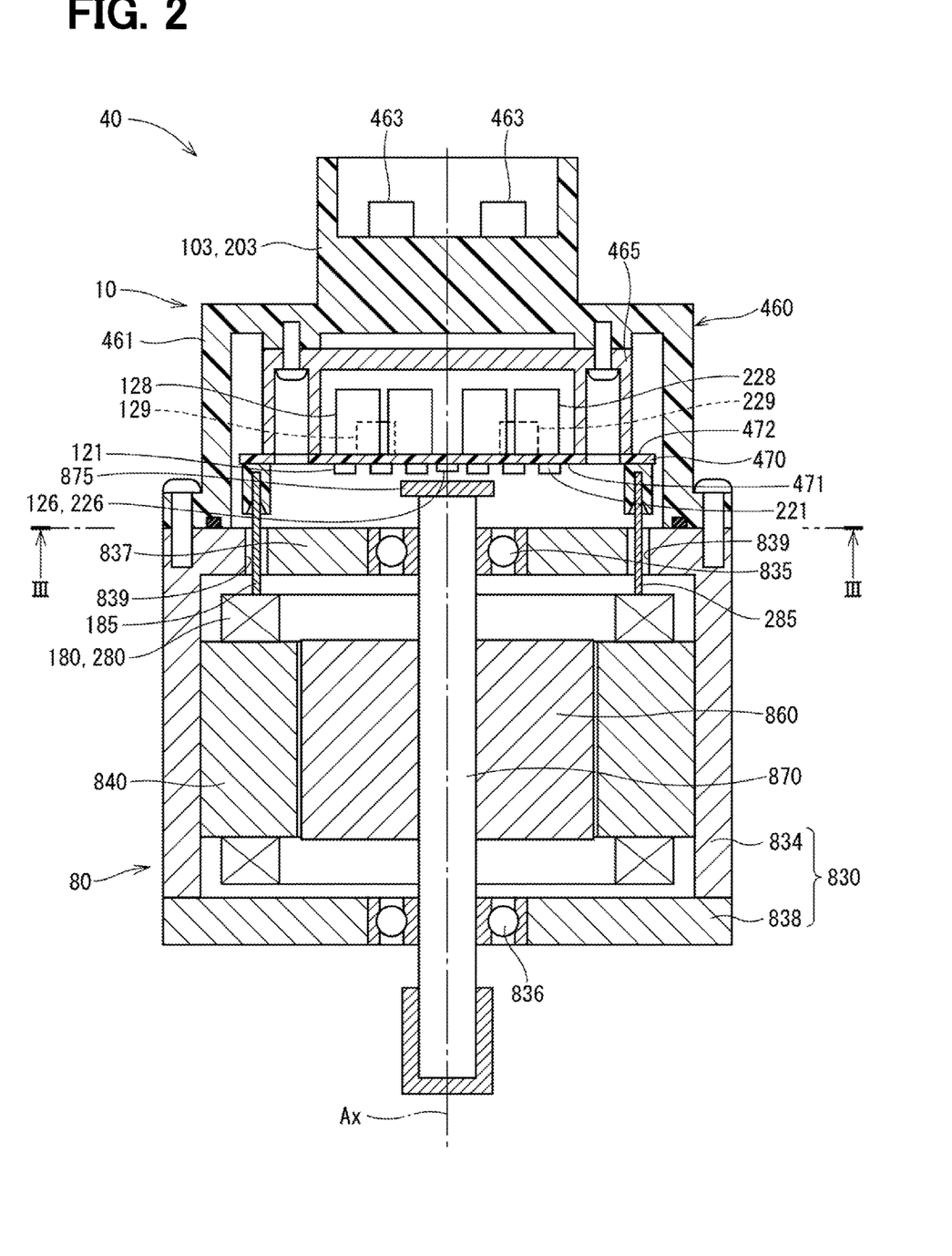
FIG. 2 is a cross-sectional view showing the rotary electric machine control device according to the embodiment.
Figure 3:
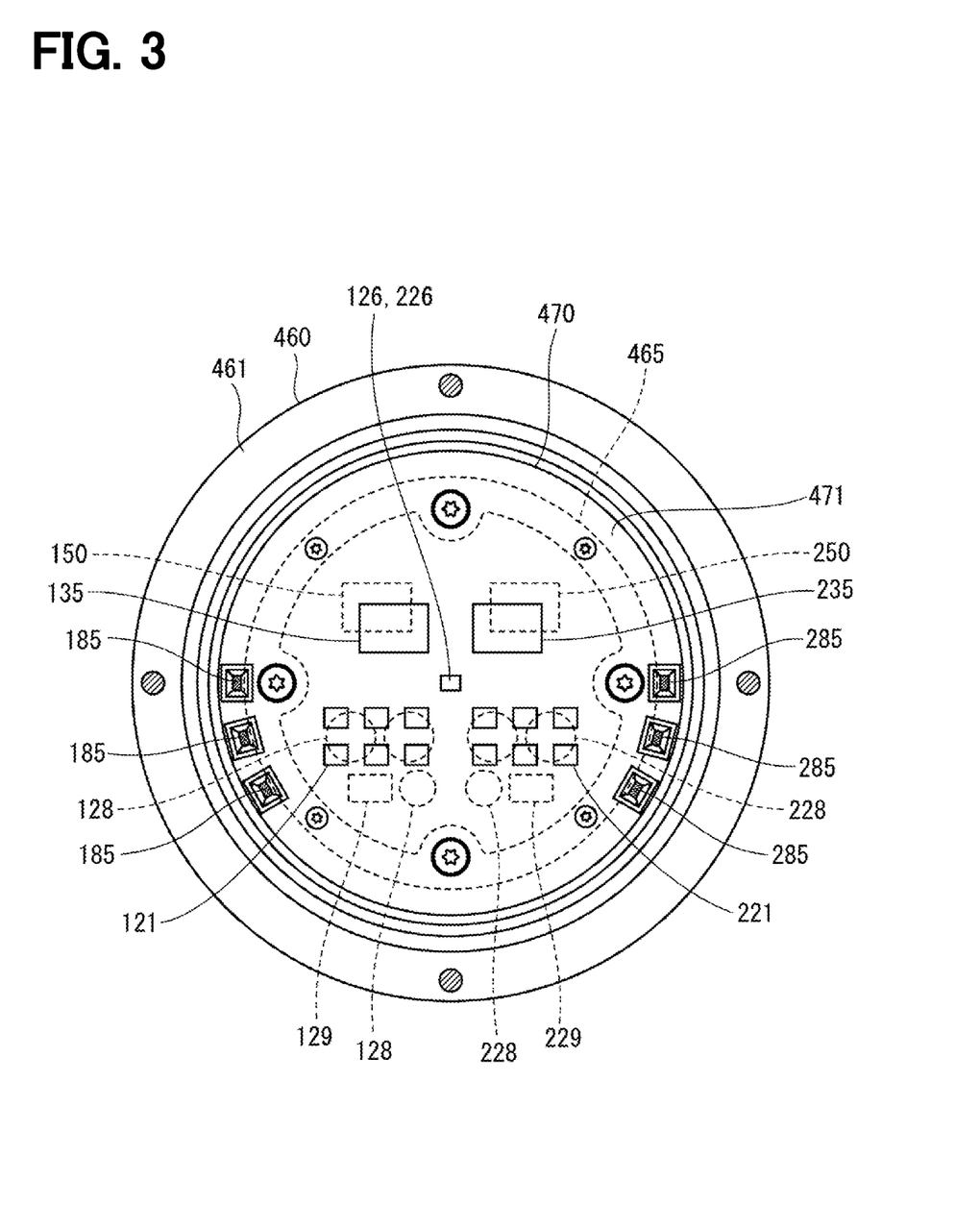
FIG. 3 is a cross-sectional view of the rotary electric machine taken along a line III-III in FIG. 2.
Figure 4:
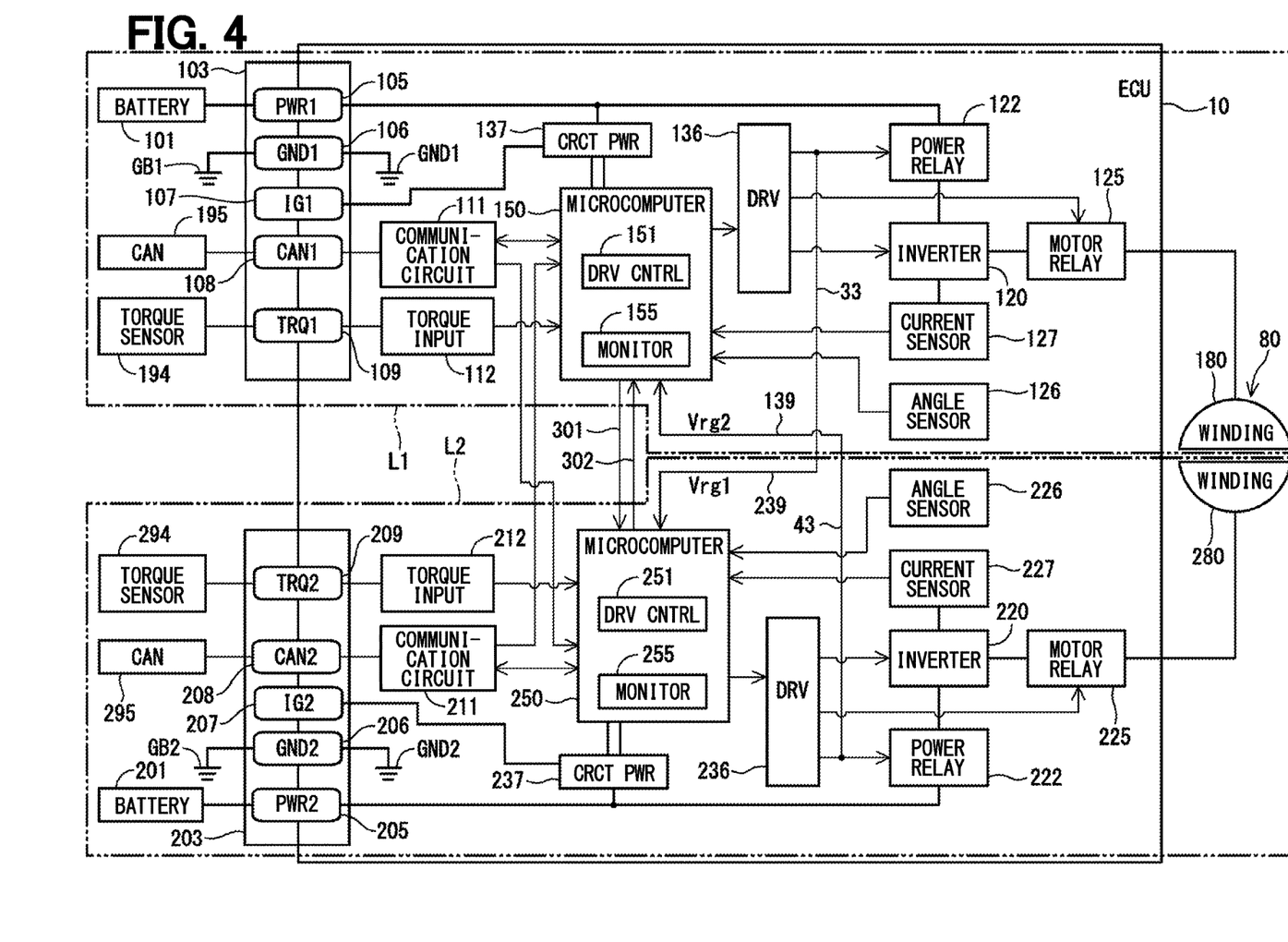
FIG. 4 is a block diagram showing an ECU according to the embodiment.

As shown in FIG. 2 to FIG. 4, the motor 80 outputs a whole or a part of an assist torque required for a steering operation. The motor 80 is driven by electric power supplied from batteries 101 and 201 provided as direct current power supplies to rotate the reduction gear 89 in forward and reverse directions. The motor 80 is a three-phase brushless motor and has a rotor 860 and a stator 840 as shown in FIG. 2.

The motor 80 has a first motor winding set 180 and a second motor winding set 280. The motor winding sets 180 and 280 have the same electrical characteristics and are wound about the stator 840 with electrical angles shifted from each other by 30 degrees. Correspondingly, phase currents are controlled to be supplied to the motor winding sets 180 and 280 such that the phase currents have a phase difference $\phi$ of 30 degrees. By optimizing a current supply phase difference, the output torque is improved. In addition, sixth-order torque ripple can be reduced, and noise and vibration can be reduced. In addition, since heat is distributed and leveled by distributing the current, it is possible to reduce temperature-dependent system errors such as a detection value and torque of each sensor element and increase the amount of current that is allowed to be supplied.

Hereinafter, a combination of a first inverter circuit 120 and a first control circuit 150 and the like, which are related to the driving control for the first motor winding set 180, will be referred to as a first system L1 and a combination of a second inverter circuit 220 and a second control circuit 250 and the like, which are related to the driving control for the second motor winding set 280, is referred to as a second system L2. The configuration related to the first system L1 is basically indicated with reference numerals of 100, and the configuration related to the second system L2 is basically indicated with reference numerals of 200. In the first system L1 and the second system L2, same or similar configuration is indicated with same reference numbers in the least significant two digits. For the other configuration described below, the term "first" is indicated with a suffix "1," and the term "second" is indicated with a suffix "2."

In a driving device 40 shown in FIG. 2, the ECU 10 is integrally provided on one side in the axial direction of the motor 80 in a machine-electronics integrated type. The motor 80 and the ECU 10 may alternatively be provided separately. The ECU 10 is positioned coaxially with an axis Ax of the shaft 870 on the side opposite to the output shaft of the motor 80. The ECU 10 may alternatively be provided on the output shaft side of the motor 80. By adopting the machine-electronics integrated type, it is possible to efficiently arrange the ECU 10 and the motor 80 in a vehicle having restricted mounting space.

The motor 80 includes, in addition to the stator 840 and the rotor 860, a housing 830 which houses the stator 840 and the rotor 860 therein. The stator 840 is fixed to the housing 830 and the motor winding sets 180 and 280 are wound thereon. The rotor 860 is provided radially inside the stator 840 to be rotatable relative to the stator 840.

The shaft 870 is fitted in the rotor 860 to rotate integrally with the rotor 860. The shaft 870 is rotatably supported by the housing 830 by bearings 835 and 836. The axial end portion of the shaft 870 on the ECU 10 side protrudes from the housing 830 to the ECU 10 side. A magnet 875 is provided at the axial end of the shaft 870 on the ECU 10 side.

The housing 830 has a bottomed cylindrical case 834, which has a rear end frame 837, and a front end frame 838 provided on an open side of a cylindrical case 834. The case 834 and the front end frame 838 and are fastened to each other by bolts or the like. Lead wire insertion holes 839 are formed in the rear end frame 837. Lead wires 185 and 285 connected to each phase of the motor winding sets 180 and 280 are inserted through the lead wire insertion holes 839. The lead wires 185 and 285 are taken out from the lead wire insertion holes 839 to the ECU 10 side and connected to a circuit board 470.

The ECU 10 includes a cover 460 and a heat sink 465 fixed to the cover 460 in addition to the circuit board 470 fixed to the heat sink 465. The ECU 10 further includes various electronic components and the like mounted on the circuit board 470. The cover 460 protects the electronic components from external impacts and prevents dust, water or the like from entering into the ECU 10. In the cover 460, a cover main body 461 and connector units 103 and 203 are integrally formed of resin. The connector units 103 and 203 may alternatively be separated from the cover main body 461. Terminals 463 of the connector units 103 and 203 are connected to the circuit board 470 via wirings (not shown) or the like. The number of connectors and the number of terminals may be changed in correspondence to the number of signals and the like. The connector units 103 and 203 are provided at the end portion in the axial direction of the driving device 40 and are open on the side opposite to the motor 80.

The circuit board 470 is, for example, a printed circuit board, and is positioned to face the rear end frame 837. On the circuit board 470, the electronic components of the first and second systems L1 and L2 are mounted independently for each system so that the two systems are provided in a fully redundant configuration. According to the present embodiment, the electronic components are mounted on one circuit board 47. The electronic components may alternatively be mounted on plural circuit boards.

Of the two principal surfaces of the circuit board 470, one surface on the side of the motor 80 is referred to as a motor-side surface 471 and the other surface opposite from the motor 80 is referred to as a cover-side surface 472. As shown in FIG. 3, switching elements 121 configuring the inverter circuit 120, switching elements 221 configuring the inverter circuit 220, rotation angle sensors 126, 226, custom ICs 135, 235 and the like are mounted on the motor-side surface 471. The angle sensors 126 and 226 are mounted at positions facing the magnet 875 to be able to detect a change in the magnetic field caused by the rotation of the magnet 875.

On the cover-side surface 472, capacitors 128, 228, inductors 129, 229, and microcomputers forming the control circuits 150, 250 are mounted. In FIG. 3, reference numerals 150 and 250 are assigned to the microcomputers provided as the control circuits 150 and 250, respectively. The capacitors 128 and 228 smoothen electric power input from the batteries 101 and 201 shown in FIG. 4. The capacitors 128 and 228 assist electric power supply to the motor 80 by storing electric charge therein. The capacitors 128, 228 and the inductors 129, 229 configures filter circuits, respectively, to reduce noises transmitted from other devices which share the battery, and also to reduce noises transmitted to the other devices, which share the battery, from the driving device 40. Although not shown in FIG. 3, power supply relays 122, 222, the motor relays 125, 225, current sensors 127, 227 and the like are also mounted on the motor-side surface 471 or the cover-side surface 472.

As shown in FIG. 4, the ECU 10 includes the inverter circuits 120, 220 and the control circuits 150, 250. In the figure and the like, the control circuit is shown as a microcomputer (MC). The ECU 10 is provided with the connector units 103 and 203. The first connector unit 103 is provided with a first power supply terminal 105, a first ground terminal 106, a first IG terminal 107, a first communication terminal 108, and a first torque terminal 109.

The first power supply terminal 105 is connected to the first battery 101 via a fuse (not shown). The electric power supplied from the positive electrode of the first battery 101 via the first power supply terminal 105 is supplied to the first motor winding set 180 via the power supply relay 122, the inverter circuit 120, and the motor relay 125. The first ground terminal 106 is connected to a first ground GND1 that is a first system ground inside the ECU 10 and a first external ground GB1 that is a first system ground outside the ECU 10. In a vehicle system, the metal body is a common GND plane. The first external ground GB1 indicates one of the connection points on the GND plane. The negative electrode of the second battery 201 is also connected to the connection point on the GND plane.

The first IG terminal 107 is connected to the positive electrode of the first battery 101 via a first switch that is on/off-controlled in conjunction with a vehicle start switch such as an ignition (IG) switch. The electric power supplied from the first battery 101 via the first IG terminal 107 is supplied to the first custom IC 135 shown in FIG. 3. The first custom IC 135 includes a first driver circuit 136 and a first circuit power supply 137 shown in FIG. 4. The first custom IC 235 further includes a microcomputer monitor, a current monitor amplifier and the like, which are not shown.

The first communication terminal 108 is connected to a first vehicle communication circuit 111 and a first vehicle communication network 195. The first vehicle communication network 195 and the first control circuit 150 are connected via the first vehicle communication circuit 111 so that transmission and reception are performed. Further, the first vehicle communication network 195 and a second control circuit 250 are connected so that only reception is performed by the second control circuit 250. Thus, even if the second control circuit 250 fails to operate, the first vehicle communication network 195 including the first control circuit 150 is not affected.

The first torque terminal 109 is connected to the first sensor element 194 of the torque sensor 94. The detection value of the first sensor element 194 is input to the first control circuit 150 via the first torque terminal 109 and the first torque sensor input circuit 112. Here, the first sensor element 194 and the first control circuit 150 are configured such that a failure of the torque sensor input circuit system is detected.

The second connector unit 203 is provided with a second power supply terminal 205, a second ground terminal 106, a second IG terminal 207, a second communication terminal 208, and a second torque terminal 209. The second power supply terminal 205 is connected to the positive electrode of the second battery 201 via a fuse (not shown). The electric power supplied from the positive electrode of the second battery 201 via the second power supply terminal 205 is supplied to the second motor winding set 280 via the power supply relay 222, the inverter circuit 220, and the motor relay 225. The second ground terminal 206 is connected to a second ground GND2 that is a second system ground inside the ECU 10 and a second external ground GB2 that is a second system ground outside the ECU 10. In the vehicle system, the metal body is a common GND plane. The second external ground GB2 indicates one of the connection points on the GND plane. The negative electrode of the second battery 201 is also connected to the connection point on the GND plane. Here, at least different systems are configured not to connect to the same connection point on the GND plane.

The second IG terminal 207 is connected to the positive electrode of the second battery 201 via a second switch that is on/off-controlled in conjunction with the start switch of the vehicle. The electric power supplied from the second battery 201 via the second IG terminal 207 is supplied to the second custom IC 235 shown in FIG. 3. The second custom IC 235 includes a second driver circuit 236 and a second circuit power supply 237. The second custom IC 235 further includes a microcomputer monitor, a current monitor amplifier and the like which are not shown.

The second communication terminal 208 is connected to a second vehicle communication circuit 211 and a second vehicle communication network 295. The second vehicle communication network 295 and the second control circuit 250 are connected via the second vehicle communication circuit 211 so that transmission and reception are performed. Further, the second vehicle communication network 295 and the first control circuit 150 are connected so that only reception is performed at the first control circuit 150. Thus, even if the first control circuit 150 fails to operate, the second vehicle communication network 295 including the second control circuit 250 is not affected.

The second torque terminal 209 is connected to the second sensor element 294 of the torque sensor 94. The detection value of the second sensor element 294 is input to the second control circuit 250 via the second torque terminal 209 and the second torque sensor input circuit 212. Here, the second sensor element 294 and the second control circuit 250 are configured such that a failure of the torque sensor input circuit system is detected.

In FIG. 4, the communication terminals 108 and 208 are connected to separate the vehicle communication networks 195 and 295, respectively, but may be connected to the same vehicle communication network. Regarding the vehicle communication networks 195 and 295 in FIG. 4, CAN (controller area network) is exemplified. However, any other standard such as CAN-FD (CAN with flexible data rate) and FlexRay may be employed.

The first inverter circuit 120 is a three-phase inverter having switching elements 121 and converts electric power for the first motor winding set 180. The second inverter circuit 220 is a three-phase inverter having switching elements 221 and converts electric power for the second motor winding set 280.

The first power supply relay 122 is provided between the first power supply terminal 105 and the first inverter circuit 120. The first motor relay 125 is provided in each phase between the first inverter circuit 120 and the first motor winding set 180. The second power supply relay 222 is provided between the second power supply terminal 205 and the second inverter circuit 220. The second motor relay 225 is provided in each phase between the second inverter circuit 220 and the second motor winding set 180.

Figure 5:
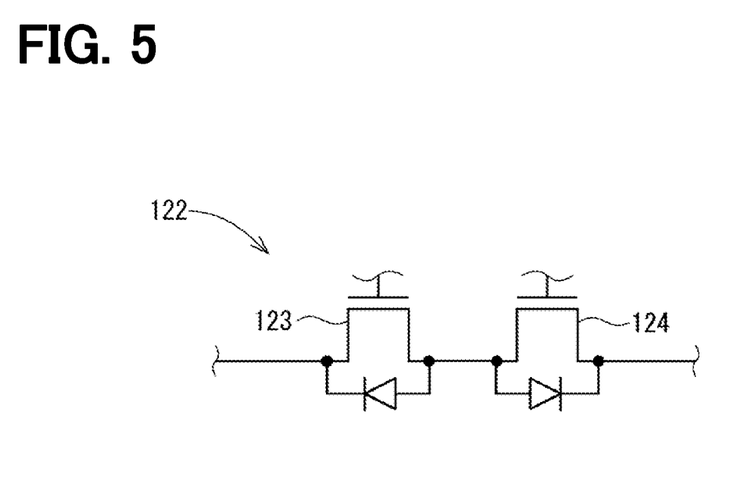
FIG. 5 is a circuit diagram showing a power supply relay according to the embodiment.

In the present embodiment, the switching elements 121 and 221 of the first and second inverter circuits 120 and 220, the power supply relays 122 and 222, and the motor relays 125 and 225 are all MOSFETs, but other elements such as IGBTs may alternatively be used. As shown in FIG. 5, in case that the first power supply relay 122 is configured by an element such as a MOSFET having a parasitic diode, two elements 123 and 124 are connected preferably in series so that the direction of the parasitic diode is reversed. The second power supply relay 222 is configured in the same way, although not shown. Thereby, even when the batteries 101 and 201 are erroneously connected in the reverse polarity direction, it is possible to prevent a reverse current from flowing. Alternatively, the power supply relays 122 and 222 may be mechanical relays.

As shown in FIG. 4, on/off operations of the first switching element 121, the first power supply relay 122 and the first motor relay 125 are controlled by the first control circuit 150. On/off operations of the second switching element 221, the second power supply relay 222 and the second motor relay 225 are controlled by the second control circuit 250.

The first angle sensor 126 detects the rotation angle of the motor 80 and outputs the detected angle value to the first control circuit 150. The second angle sensor 226 detects the rotation angle of the motor 80 and outputs the detected angle value to the second control circuit 250. The first angle sensor 126 and the first control circuit 150, and the second angle sensor 226 and the second control circuit 250 are configured such that a failure of each angle sensor input circuit system is detected.

The first current sensor 127 detects a current that is supplied to each phase of the first motor winding set 180. The current detection value of the first current sensor 127 is amplified by an amplifier circuit in the custom IC 135 and output to the first control circuit 150. The second current sensor 227 detects a current that is supplied to each phase of the second motor winding set 280. The current detection value of the second current sensor 227 is amplified by an amplifier circuit in the custom IC 235 and output to the second control circuit 250.

The first driver circuit 136 outputs driving signals to each element for driving the first switching element 121, the first power supply relay 122 and the first motor relay 125 based on control signals applied from the first control circuit 150. The second driver circuit 236 outputs driving signals to each element for driving the second switching element 221, the second power supply relay 222 and the second motor relay 225 based on control signals applied from the first control circuit 150.

Each of the control circuits 150 and 250 is mainly composed of a microcomputer and the like, and internally includes, although not shown in the figure, a CPU, a ROM, a RAM, an I/O, a bus line for connecting these components, and the like. Processing executed by each of the control circuits 150 and 250 may be software processing or may be hardware processing. The software processing may be implemented by causing the CPU to execute a program. The program may be stored beforehand in a memory device such as a ROM, that is, in a computer-readable, non-transitory, tangible storage medium. The hardware processing may be implemented by a special purpose electronic circuit. Here, the first control circuit 150 and the second control circuit 250 are configured such that, for example, a locked-step dual microcomputer or the like is used, and their own failures are detected.

The first control circuit 150 includes a driver control section 151 and an abnormality monitor section 155. The driver control section 151 controls current supply to the first motor winding set 180 by controlling the on/off operation of the first switching element 121. The driver control section 151 controls the on/off operations of the first power supply relay 122 and the first motor relay 125.

The abnormality monitor section 155 monitors the abnormality of the first system L1, which is its own system, together with the first custom IC 135. When an abnormality that should stop the own system occurs, the first control circuit 150 turns off one or more of the first inverter circuit 120, the first power supply relay 122, and the first motor relay 125, which relate to the current supply from the first battery 101 to the first winding set 180.

The second control circuit 250 includes a driver control section 251 and an abnormality monitor section 255. The driver control section 251 controls current supply to the second motor winding set 280 by controlling the on/off operation of the second switching element 221. The driver control section 151 controls the on/off operations of the second power supply relay 222 and the second motor relay 225

The abnormality monitor section 255 monitors an abnormality of the second system L2, which is its own system, together with the second custom IC 235. When an abnormality that should stop the own system occurs, the second control circuit 250 turns off one or more of the second inverter circuit 220, the second power supply relay 222, and the second motor relay 225 which relate to the current supply from the second battery 201 to the second winding set 280.

The abnormality monitor section 155 monitors a state of communication with the second control circuit 250 and the operation state of the second system L2. As a method for monitoring the operation state of the second system L2, the abnormality monitor section 155 monitors at least one state of a circuit (for example, the second inverter circuit 220, the second power supply relay 222, and the second motor relay 225), which stops the own system when an abnormality in the second system L2 is detected, or a signal line 302 to check whether an emergency stop has occurred. In the present embodiment, an other-system relay monitor circuit 139 is provided to acquire a second relay gate signal Vrg2 output from the second driver circuit 236 to the second power supply relay 222, and monitor the state of the second power supply relay 222 based on the second relay gate signal Vrg2. Hereinafter, the information acquired from the other-system relay monitor circuit is referred to as other-system relay information, monitoring of the operation state of the other system based on the other-system relay information is referred to as an other-system relay monitoring, and the monitored relay is referred to as an other-system relay. When information indicating that the other-system relay remains in the off-state is acquired at the timing when the other-system relay should be in the on-state, it is determined that the other-system relay information is abnormal.

The abnormality monitor section 255 monitors a state of communication with the second control circuit 150 and the operation state of the first system L1. As a method for monitoring the operation state of the first system L1, the abnormality monitor section 255 monitors at least one state of a circuit (for example, the first inverter circuit 120, the first power supply relay 122, and the first motor relay 125), which stops the own system when an abnormality in the first system L1 is detected, or a signal line 301 to check whether an emergency stop has occurred. In the present embodiment, an other-system relay monitor circuit 239 is provided to acquire a first relay gate signal Vrg1 output from the first driver circuit 136 to the first power supply relay 122, and monitors the state of the first power supply relay 122 based on the first relay gate signal Vrg1. Instead of the relay gate signal, the other system monitoring may be performed by using an intermediate voltage between the two elements 123 and 124 forming the power supply relay 122, a relay driving signal output from the control circuit 150, or a relay output signal between the power supply relay 122 and the inverter circuit 120. The first control circuit 150 is configured to monitor the second system L2 in the same way as described above.

The first control circuit 150 and the second control circuit 250 are connected through signal lines 301 and 302 to be able to transmit and receive information through inter-computer communications. In the signal line 301, the first control circuit 150 is an output side, and the second control circuit 250 is an input side. In the signal line 302, the second control circuit 250 is an output side, and the first control circuit 150 is an input side. That is, the input and output directions of the signal lines 301 and 302 are opposite.

In the present embodiment, the abnormality of the other system is monitored based on the other-system relay state and the inter-computer communication information. In addition, the abnormal state is determined and the motor driving procedure is changed according to the order of occurrence of failures and the timing of failure detection. Hereinafter, it is assumed that the microcomputer of the own system is normal by self-system monitoring. Further, a flag indicating the other-system relay state is referred to as an other-system relay abnormality flag FLG_R, and a flag indicating the state of the inter-computer communication is referred to as an inter-computer communication state flag FLG_M. Each of the other-system relay error flag FLG_R and the inter-computer communication state flag FLG_M has four patterns, that is, "normal" indicating no abnormality, "detecting" indicating detection of abnormality but not finally fixed, "initial failure" indicating that the failure is already fixed at the time of initial checking, and "normal-time failure" indicating that the abnormality is fixed during the normal operation.

Figure 6:
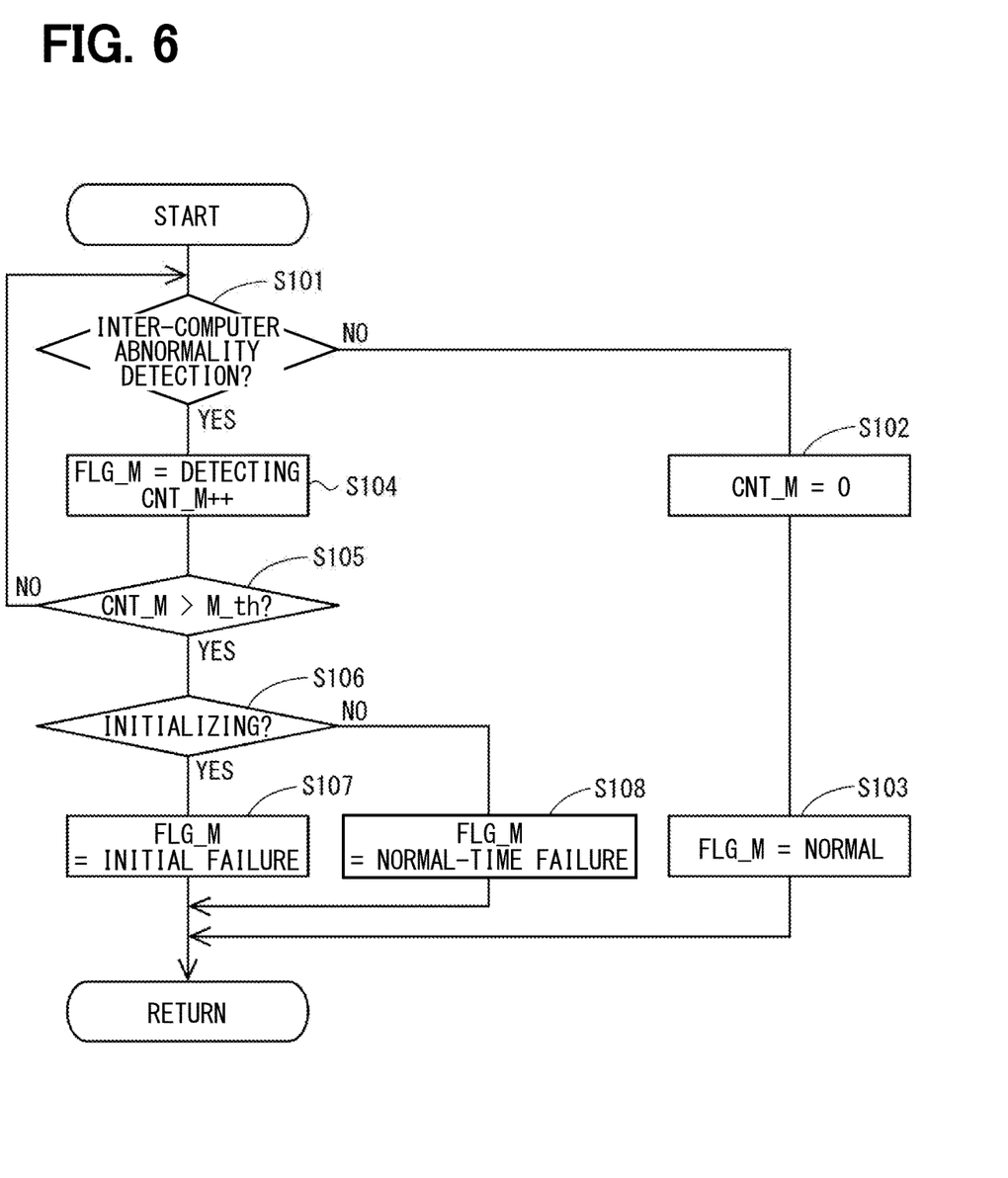
FIG. 6 is a flowchart showing an inter-computer communication failure check process according to the embodiment.
Figure 7:
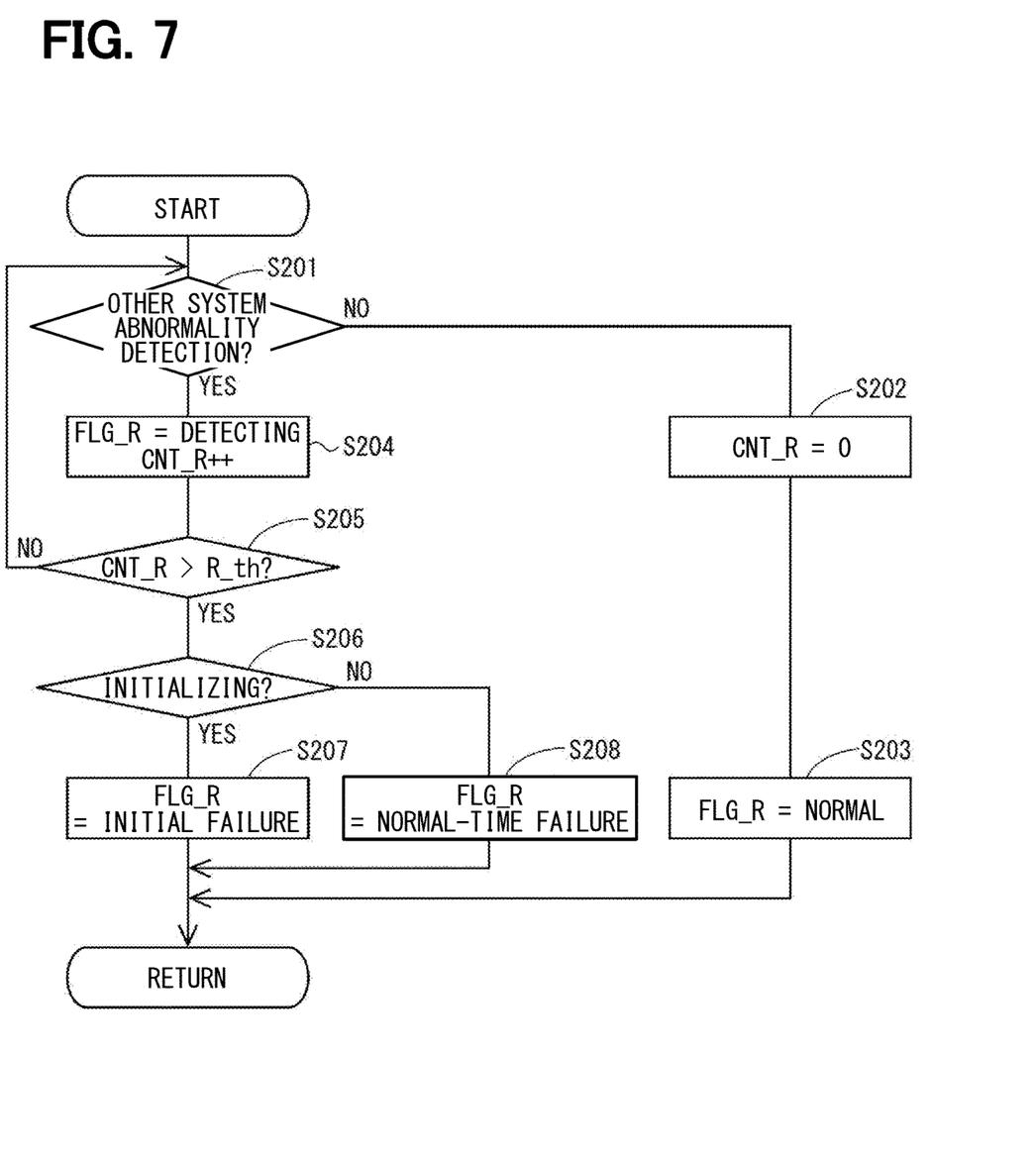
FIG. 7 is a flowchart showing an other-system relay information check process according to the first embodiment.
Figure 8:
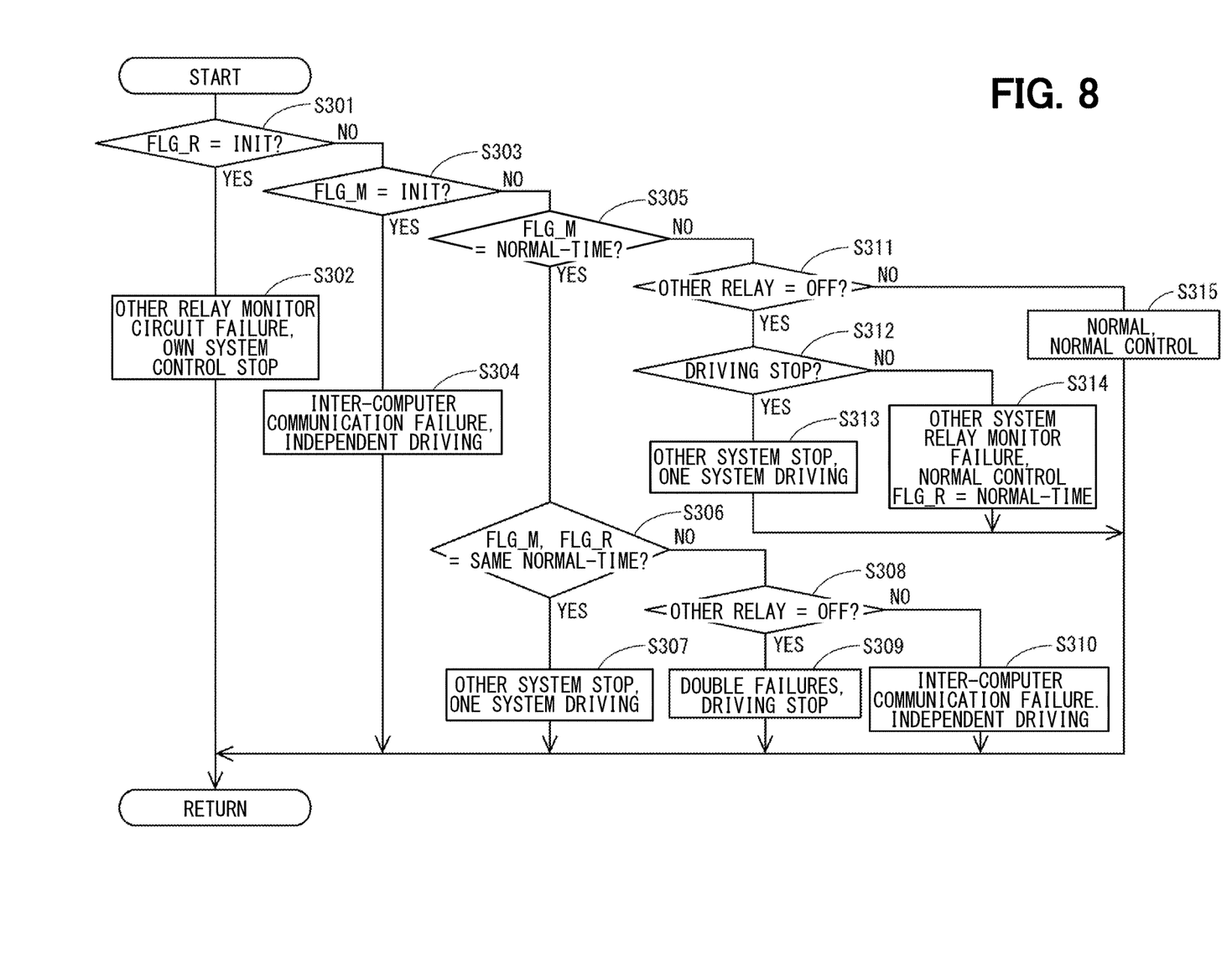
FIG. 8 is a flowchart showing a drive mode selection process according to the embodiment.

The inter-computer communication failure check process will be described next with reference to a flowchart shown in FIG. 6. Each process described with reference to FIG. 6 to FIG. 8 is executed by the first and second control circuits 150 and 250 at a predetermined cycle period. The control cycle period of each process may be the same or different. Here, the process executed by the first control circuit 150 will be described as an example. In this case, the first system L1 is the own system and the second system is the other system. Since the process in the second control circuit 250 is the same as the process in the first control circuit 150, the process of the second control circuit will be understood by assuming that the second system L2 is the own system and the first system L1 is the other system. Hereinafter, "step" such as step S101 is simply indicated as a symbol S. In the following description, the driver control sections 151, 251 and the abnormality monitor section 155, 255 are program sections executed by the microcomputers 150, 250.

In S101, the abnormality monitor section 155 checks whether an inter-computer communication abnormality has occurred. An abnormality in communication between microcomputers is checked based on communication interruption, fixation of a signal to an upper limit value or a lower limit value, or the like. In case it is determined that no inter-computer communication abnormality is detected (S101: NO), S102 is executed. In S102, the first control circuit 150 resets an inter-computer communication error counter CNT_M, and sets an inter-computer communication state flag FLG_M to "normal" in S103. In case it is determined that the inter-computer communication abnormality is detected (S101:YES), S104 is executed.

In S104, the abnormality monitor section 155 sets the inter-computer communication status flag FLG_M to "detecting" indicating "under detection" and increments the inter-computer communication abnormality counter CNT_M. In S105, the abnormality monitor section 155 checks whether the inter-computer communication abnormality counter CNT_M is greater than an inter-computer communication abnormality finalization threshold value M_th. When it is determined that the inter-computer communication abnormality counter CNT_M is equal to or smaller than the inter-computer communication abnormality finalization threshold value M_th (S105: NO), the processing returns to S101. When it is determined that the inter-computer communication abnormality counter CNT_M is larger than the inter-computer communication abnormality finalization threshold value M_th (S105: YES), S106 is executed.

In S106, the abnormality monitor section 155 checks whether an initial check is being performed. The initial check is performed before the drive control of the motor 80 is started, such as when a start switch of a vehicle such as an ignition switch is turned on. when it is determined that the initial check is being performed (S106: YES), S107 is executed, and the inter-computer communication state flag FLG_M is set to "initial failure." When it is determined that the initial check is not being performed (S106: NO), S108 is executed. The inter-computer communication status flag FLG_M is set to "normal-time failure".

The other-system relay information check process will be described next with reference to the flowchart shown in FIG. 7. In S201, the abnormality monitor section 155 checks whether an abnormality of the other-system relay information is detected. For example, when the voltage acquired as the other-system relay information is outside a predetermined normal range, it is determined that the other-system relay information is abnormal. When it is determined that no abnormality is detected in the other system L2 (S201: NO), S202 is executed. In S202, the abnormality monitor section 155 resets the other-system relay abnormality counter CNT_R and sets the other-system relay abnormality flag to "normal." When it is determined that the abnormality of the other-system relay information is detected (S201: YES), S204 is executed.

In S204, the abnormality monitor section 155 sets the other-system relay abnormality flag FLG_R to "detecting" and increments the other-system relay abnormality counter CNT_R. In S205, the abnormality monitor section 155 checks whether the other-system relay abnormality counter CNT_R is larger than the other-system relay abnormality determination threshold value R_th. When it is determined that the other-system relay abnormality counter CNT_R is equal to or smaller than the other-system relay abnormality determination threshold value R_th (S205: NO), the process returns to S201. When it is determined that the other-system relay abnormality counter CNT_R is larger than the other-system relay abnormality determination threshold value R_th (S205: YES), S206 is executed.

In S206, similarly to S106, the abnormality monitor section 155 checks whether an initial check is being performed. When it is determined that the initial check is being performed (S206: YES), S207 is executed, and the other-system relay abnormality flag FLG_R is set to "initial failure." When it is determined that the initial check is not being performed (S206: NO), S208 is executed, and the other-system relay abnormality flag FLG_R is set to "normal-time failure".

A drive mode selection process will be described next with reference to the flowchart of FIG. 8. This process is executed at a predetermined cycle period during the drive control of the motor 80. When the control is normal, the power supply relays 122 and 222 are in the on-state. Here, it is assumed that the own system is the first system L1, and the control circuit 150 and the drive system of the first system L1 is normal. In FIG. 8, the initial failure of each flag is described as "INIT", and the normal-time failure is described as "normal-time".

In S301, the abnormality monitor section 155 checks whether the other-system relay abnormality flag FLG_R is the initial failure. When it is determined that the other-system relay abnormality flag FLG_R is the initial failure (S301: YES), S302 is executed, and the other-system relay monitor circuit 139 is determined to be abnormal. The driver control section 151 stops the driving control of the motor 80 using the own system. Hereinafter, stopping the control using the own system is referred to as "own system control stop." When it is determined that the other-system relay abnormality flag FLG_R is not the initial failure (S301: NO), S303 is executed.

In S303, the abnormality monitor section 155 determines whether the inter-computer communication state flag FLG_M is the initial failure. When it is determined that the inter-computer communication state flag FLG_M is the initial failure (S303: YES), S304 is executed, and it is determined to be the inter-computer communication abnormality. The driver control section 151 controls the driving of the motor 80 by independent driving that does not use information of the second system L2. When it is determined that the inter-computer communication state flag FLG_M is not the initial failure (S303: NO), S305 is executed.

In S305, the abnormality monitor section 155 checks whether the inter-computer communication state flag FLG_M is the normal-time failure. When it is determined that the inter-computer communication state flag FLG_M is not the normal-time failure (S305: NO), S311 is executed. When it is determined that the inter-computer communication state flag FLG_M is the normal-time failure (S305: YES), S306 is executed.

In S306, the abnormality monitor section 155 checks whether the timing at which the normal-time failure of the inter-computer communication state flag FLG_M is set and the timing at which the normal-time failure of the other-system relay abnormality flag FLG_R is set at the same time. Here, "simultaneous" means that a time difference corresponding to a difference between the timing at which the inter-computer communication stops and the timing at which the power supply relay 222 is turned off when the abnormality of the second control circuit 250 occurs is small and tolerable.

When it is determined that the normal-time failure of the inter-computer communication status flag FLG_M and the normal-time failure of the other-system relay abnormality flag FLG_R are simultaneously set (S306: YES), S307 is executed. In S307, the abnormality monitor section 155 specifies that the communication abnormality and the other system stop have occurred at the same time, and the other system stop is caused by the abnormality of the second control circuit 250 or the like. The driver control section 151 performs the single system drive for driving the motor 80 by controlling the current supply to the motor winding set 180 by the own system. In the single system driving, one system may be simply stopped and controlled by the other system in the same way as the independent driving, or the gain and rating may be increased to compensate for the output of the stopped system.

When it is determined that the normal-time failure of the inter-computer communication status flag FLG_M and the normal-time failure of the other-system relay abnormality flag FLG_R are not simultaneously set (S306: NO), S308 is executed. It is noted that, when the normal-time failure of the other-system relay abnormality flag FLG_R is set before the normal-time failure of the inter-computer communication state flag FLG_M is set, and when the other-system relay abnormality flag FLG_R Is not set, a negative determination NO is made in S306.

In S308, the abnormality monitor section 155 checks based on the other-system relay information whether the other-system relay is turned off. When it is determined that the other-system relay is turned off (S308: NO), S309 is executed. When it is determined that the other-system relay is turned on (S308: NO), S310 is executed.

In S309, since the timing at which the inter-computer communication abnormality is generated is different from the timing at which the other-system relay is turned off, the abnormality monitor section 155 determines that a double failure has occurred. The driver control sections 151 and 251 stop driving the motor 80. In S310, the abnormality monitor section 155 determines that the inter-computer communication abnormality has occurred. The driver control section 151 controls driving of the motor 80 by the independent driving.

When it is determined that the initial abnormality has not occurred in the inter-computer communication and the inter-computer communication state flag FLG_M is not the normal-time failure (S305: NO), S311 is executed. In S311, the abnormality monitor section 155 checks whether the other-system relay is turned off based on the other-system relay information. When it is determined that the other-system relay is in the on-state (S311: NO), S315 is executed, and the ECU 10 is determined to be normal. The driver control section 151 controls driving of the motor 80 by the normal control. The normal control is a coordinated control using information shared by communication between the first and second control circuits 150 and 250. When it is determined that the other-system relay is in the off-state (S311: YES), S312 is executed.

In S312, since the inter-computer communication is normal, the abnormality monitor section 155 checks whether the driving of the other system is stopped based on the information on the inter-computer communication. When it is determined that the driving of the second system is stopped (S312: YES), S313 is executed. When it is determined that the driving of the other system is not stopped (S312:NO), S314 is executed.

In S313, the abnormality monitor section 155 determines that the other system is stopped due to some abnormality in the other system. The driver control section 151 performs the single system driving for driving the motor 80 by controlling the current supply to the motor winding set 180 by the own system.

In S314, since the off-state of the other-system relay is detected based on the other-system relay information even though the other system is being driven, the abnormality monitor section 155 determines the abnormality of the other-system relay monitor circuit 139. Even if the other-system relay monitor circuit 139 is abnormal, there is no influence on the driving control of the motor 80, so the driver control section 151 continues the normal control. In addition, the abnormality monitor section 155 sets the other-system relay abnormality flag FLG_R to the normal-time failure.

Figure 9:
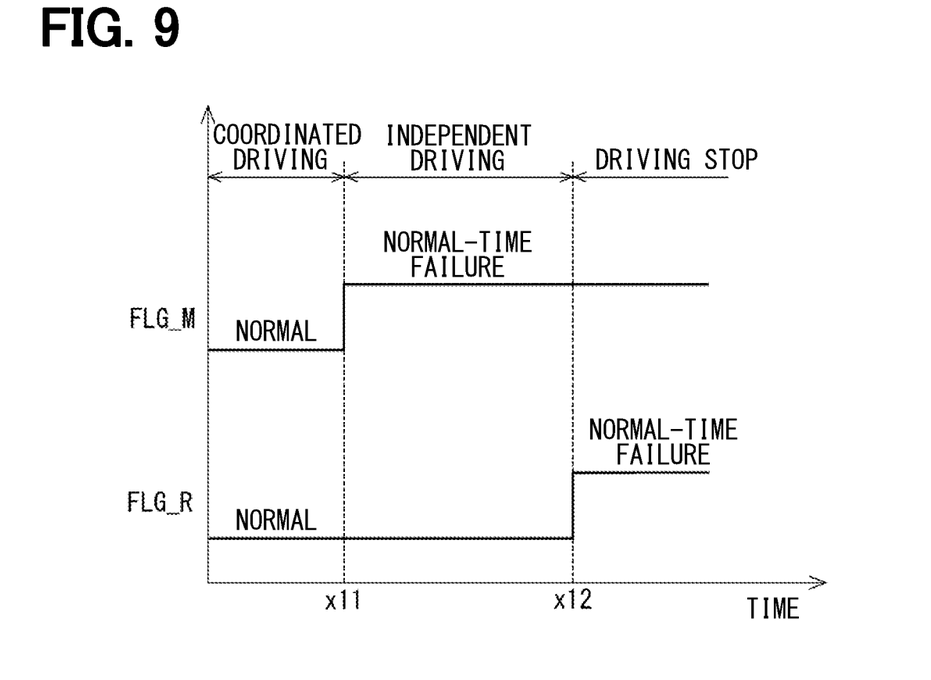
FIG. 9 is a time chart showing selection of a driving mode according to the embodiment.
Figure 10:
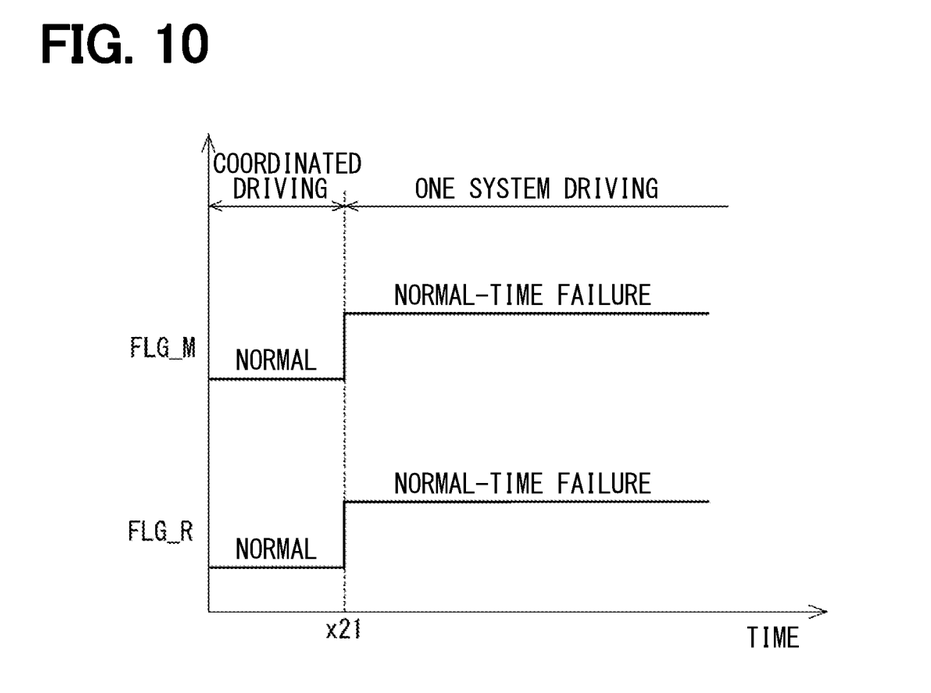
FIG. 10 is a time chart showing selection of a driving mode according to the embodiment.

The selection of the driving mode in the present embodiment will be described with reference to the time charts of FIG. 9 and FIG. 10. In FIG. 9 and FIG. 10, the horizontal axis indicates time, the inter-computer communication state flag FLG_M is shown in the upper row, and the other-system relay abnormality flag FLG_R is shown in the lower row.

As shown in FIG. 9, since the inter-computer communication status flag FLG_M and the other-system relay abnormality flag FLG_R are both normal until time x11, the motor 80 is driven by the two systems L1 and L2 by the coordinated control using the information shared through the inter-computer communication.

At time x11, the inter-computer communication status flag FLG_M becomes the normal-time failure. At this time, since the other-system relay abnormality flag FLG_R remains to be normal, it is determined that the inter-computer communication abnormality is present. At this time, even when the inter-computer communication is abnormal, there is no abnormality in the driving systems of both systems. Therefore, the motor 80 is driven by the two systems by independent driving.

When the other-system relay abnormality flag FLG_R becomes the normal-time failure at time x12 after the inter-computer communication state flag FLG_M has become the normal-time failure, another abnormality is present in the other system in addition to the inter-computer communication abnormality. In this case, it is determined that double failures are present. In case of the double failures, driving of the motor 80 is stopped and the system operation is stopped, so that occurrence of three or more failures are prevented from being generated unexpectedly.

In the example shown in FIG. 10, since the inter-computer communication status flag FLG_M and the other-system relay abnormality flag FLG_R are both normal until time x11, the motor 80 is driven by the two systems until time x21 by the coordinated control using the information shared through the inter-computer communication.

At time x21, the inter-computer communication status flag FLG_M and the other-system relay abnormality flag FLG_R are simultaneously the normal-time failure. In this case, since it is possible to determine that driving of the other system is stopped and the inter-computer communication is stopped due to the abnormality of the microcomputer, the motor 80 is driven by one system which is normal.

In the present embodiment, the state of the other system is properly determined by monitoring the state of the other system through the inter-computer communication and monitoring by the other-system relay information. Furthermore, the failure state is determined more appropriately by taking into consideration whether the failure is the initial-time failure which is already present at the initial time or the normal-time failure which occurred during the normal control, and the timing of occurrence of the failure. Thereby, appropriate control according to the failure state can be selected. Further, it is possible to prevent an unintended control state such as stoppage of both systems due to erroneous determination of the failure state or excessive output due to output increase in both systems.

As described above, the ECU 10 according to the present embodiment is configured to control driving of the motor 80 including the motor winding sets 180 and 280, and includes the plurality of inverter circuits 120 and 220 and the plurality of control circuits 150 and 250 capable of mutual communication. The inverter circuits 120 and 220 switch over the current supply to the motor winding sets 180 and 280. The control circuits 150 and 250 include the driver control sections, which control inverter circuits 120 and 220 provided correspondingly, and the abnormality monitor sections 155 and 255, which monitor the abnormality.

Combinations of components including the inverter circuits 120 and 220 provided in correspondence to the control circuits 150 and 250, respectively, form two systems. One of the systems related to its own control circuit is referred to as the own system, and the other of the systems related to the other control circuit is referred to as the other system. The abnormality monitor sections 155 and 255 monitor the abnormality of the own system and the other system based on the plurality of abnormality information. The driver control sections 151 and 251 change the control mode according to the determined abnormal state. In this way, it is possible to control the driving of the motor 80 appropriately based on the abnormality state.

In each system, the power supply relay 122, 222, which turns off the power supply to the motor winding set 180, 280 when the abnormality occurs in the own system, and the other state relay monitor circuit 139, 239, which outputs the state of the power supply relay of the other system to the control circuit 150, 250 are provided. That is, the first control circuit 150 turns off the power supply relay 122 when the abnormality occurs in the first system L1, and the second control circuit 250 turns off the power supply relay 222 when the abnormality occurs in the second system L2. The first control circuit 150 acquires the state of the power supply relay 222 from the other-system relay monitor circuit 139, and the second control circuit 250 acquires the state of the power supply relay 122 from the other-system relay monitor circuit 239. The abnormality information includes communication abnormality information related to the communication state between the control circuits 150 and 250 and the other-system relay information related to the state of the other-system relay. By combining the communication abnormality information and the other-system relay information, the abnormal state can be appropriately specified.

The abnormality monitor sections 155 and 255 change the control mode according to the timing when the communication between the control circuits 150 and 250 becomes abnormal and the timing when the other-system relay information becomes abnormal. By adding the abnormality detection timing, the abnormal state can be determined and hence an appropriate control mode can be selected.

When the communication abnormality between the control circuits 150 and 250 and the abnormality of the other-system relay are detected at the same time during the driving of the motor 80, the abnormality is identified as the abnormality of the control circuit of the other system. At this time, the control by the other system is stopped and the driving of the motor 80 by the own system is continued. Further, when the communication abnormality between the control circuits 150 and 250 and the abnormality of the other-system relay are detected at different timings, it is determined that a plurality of locations are in failure and the driving of the motor 80 is stopped. As a result, it is possible to appropriately determine whether the abnormality is present in the control circuit 150, 250 itself at a plurality of locations. Therefore, it is possible to prevent an unintended transition of operation such as stopping the driving of the motor 80 in either system under a state that the motor 80 is still in a controllable state and an unnecessary output increase caused by erroneous recognition of the state of the other system. In addition, the system is stopped when a duplicate failure occurs. As a result, an unexpected failure such as a further duplicate failure can be prevented.

When the communication between the control circuits 150 and 250 is normal and the other-system relay is normal during driving of the motor 80, the other system is determined to be normal. In this case, the motor 80 is driven by coordinated control by the plurality of systems while using the information shared by the communication between the control circuits 150 and 250. In the coordinated control, at least a part of information, for example, a command value or a limit value related to current control, a current detection value or the like is shared and commonly used by the plurality of systems. When the communication between the control circuits 150 and 250 is abnormal and the other-system relay is normal, it is determined that the communication is abnormal. In this case, the driving of the motor 80 is controlled by the plurality of systems without using information provided in the other system. Thereby, even when the communication is abnormal, the driving of the motor 80 can be continued without reducing the output as far as the drive system in each system is normal.

When the communication between the control circuits 150 and 250 is normal during the driving of the motor 80 and the abnormality in the other-system relay information is detected during the driving by the other system based on the information acquired by the communication, the other-system relay monitor circuit 139, 239 is determined to be abnormal and the control by the own system is stopped. In a state where the other system cannot be monitored, it is possible to prevent transition to an unintended state by stopping the control.

When the other-system relay information is abnormal in the initial checking before starting the driving of the motor 80, it is determined that the other-system relay monitor circuit 139, 239 is abnormal. In this case, the control by the own system is prohibited and the motor 80 is driven by the other system. When the communication between the control circuits 150 and 250 is abnormal in the initial checking, the driving of the motor 80 is controlled by the plurality of systems independently without using the information provided from the other system. Accordingly, the motor control operation can be appropriately changed by classifying the abnormal state based on whether the failure occurred during the driving of the motor or is already present at the initial time.

The electric power steering device 8 includes the ECU 10 and the motor 80. Since the control circuits 150 and 250 have the above-described configuration, the motor 80 can be appropriately driven continuously even when the abnormality occurs in a part of the configuration related to the driving control for the motor 80. In addition, since the ECU 10 and the control circuits 150 and 250 are applied to the electric power steering apparatus 8, the steering operation is appropriately assisted continuously even when the abnormality occurs in a part of the configuration related to the driving control for the motor 80.

In the present embodiment, the ECU 10 is the rotary electric machine control device, the motor 80 is the rotary electric machine, the power supply relays 122 and 222 are the turn-off units, and the other-system relay monitor circuits 139 and 239 are the other system turn-off unit monitor circuits. The other-system relay information is the other system turn-off unit information. As described above, the turn-off unit may be at least one of the inverters 120 and 220, the power relays 122 and 222, and the motor relays 125 and 225. In the first control circuit 150, the second power supply relay 222 is the other system turn-off unit. In the second control circuit 250, the first power supply relay 122 is the other system turn-off unit. The control mode includes the coordinated control, the independent control, the single system control, the drive stop and the like.

Other Embodiment

In the above embodiment, the abnormality information includes the communication abnormality information and the other system turn-off unit information. As the other embodiment, the abnormality information may include information other than the communication abnormality information and the other system turn-off unit information.

In the above embodiment, two motor winding sets, two inverter circuits and two control circuits are provided. As the other embodiment, three or more systems may be provided with three or more winding sets, drive circuits and control circuits, respectively. In addition, a plurality of components may be provided in each system in such a manner that a plurality of control circuits are provided in one system, or a plurality of driver circuits and a plurality of winding sets are provided for one control circuit. Moreover, one set of motor winding sets may be provided for a plurality of inverter circuits.

In the above embodiment, the rotary electric machine is the three-phase brushless motor. As the other embodiment, the rotary electric machine is not limited to the brushless motor and may be any types of motor. The rotary electric machine is not limited to the motor, and may be a generator, or may be a motor generator having both functions of the motor and the generator. In the above embodiment, the control unit is applied to the electric power steering apparatus. As the other embodiment, the rotary electric machine control device may be applied to a device other than the electric power steering apparatus.

Control units and methods described in the present disclosure may be implemented by a special purpose computer which is configured with a memory and a processor programmed to execute one or more particular functions embodied in computer programs of the memory. Alternatively, the control unit described in the present disclosure and the method thereof may be realized by a dedicated computer configured as a processor with one or more dedicated hardware logic circuits. Alternatively, the control unit and the method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiment, and various modifications may be implemented without departing from the spirit of the present disclosure.

What is claimed is:

1. A rotary electric machine control device for controlling driving of a rotary electric machine, the rotary electric machine control device comprising:
   a plurality of inverter circuits for switching over current supply to the rotary electric machine; and
   a plurality of control circuits, each including a driver control section provided for controlling the inverter circuit, and an abnormality monitor section for monitoring an abnormality, the control circuits being capable of mutual communication, wherein:
   the plurality of inverter circuits and the plurality of control circuits are connected to form a plurality of systems in combination, respectively, one of the plurality of systems forming an own system and another one of the plurality of systems forming an other system;
   the abnormality monitor sections monitor abnormalities of the own system and the other system based on a plurality of abnormality information, and
   the driver control sections change a control mode in accordance with an abnormality state determined by the abnormality monitor sections.

2. The rotary electric machine control device according to claim 1, wherein:
   each of the plurality of systems includes a turn-off unit, which turns off the current supply to the rotary electric machine when an abnormality occurs in the own system, and an other system turn-off monitor unit monitor circuit which outputs an operation state of an other system turn-off unit of the other system; and
   the abnormality information includes communication abnormality information related to a state of communication between the control circuits, and other system turn-off unit information related to the operation state of the other system turn-off unit.

3. The rotary electric machine control device according to claim 2, wherein:
   the abnormality monitor section change the control mode in accordance with a timing of occurrence of an abnormality in the communication between the control circuits and a timing of occurrence of an abnormality of the other system turn-off unit information.

4. The rotary electric machine control device according to claim 3, wherein:
the own system continues controlling the driving of the rotary electric machine and the other system stops controlling the driving of the rotary electric machine, when the abnormality of communication between the control circuits and the abnormality of the other system turn-off unit are detected at same time during the driving of the rotary electric machine; and
the driving of the rotary electric machine is stopped, when the abnormality of communication between control circuits and the abnormality of the other system turn-off unit are detected at different time during the driving of the rotary electric machine.

5. The rotary electric machine control device according to claim 2, wherein:
the rotary electric machine is driven by coordinated control by the plurality of systems using information shared by the plurality of control circuits, when the communication between the control circuits is normal and the other system turn-off unit is normal; and
the rotary electric machine is driven by independent control by the plurality of systems without using information of the other system, when the communication between the control circuits is abnormal and the other system turn-off unit is normal.

6. The rotary electric machine control device according to claim 2, wherein:
the other system turn-off unit monitor circuit is determined to be abnormal, when the abnormality of the other system turn-off unit information is detected under a state that the communication between the control circuits is normal and the rotary electric machine is being driven by the other system using the information acquired by communication between the control circuits.

7. The rotary electric machine control device according to claim 2, wherein:
the other system turn-off unit monitor circuit is determined to be abnormal and the rotary electric machine is driven by the other system while prohibiting the control by the own system, when the other system turn-off unit information is abnormal at an initial checking executed before starting driving of the rotary electric machine.

8. The rotary electric machine control device according to claim 2, wherein:
the rotary electric machine is driven by independent control by the plurality of systems without using information of the other system, when the communication between the control circuits is abnormal at an initial checking executed before starting driving of the rotary electric machine.

9. An electric power steering apparatus comprising:
a motor provided as the rotary electric machine;
the rotary electric machine control device according to claim 2; and
wherein the rotary electric machine control device is configured to continue a steering assist operation by the motor even when the abnormality occurs in a part of a configuration of driving control for the rotary electric machine.

10. The electric power steering apparatus according to claim 9, wherein:
each of the control circuits is a microcomputer configured to execute processes of controlling the inverter circuit and monitoring an abnormality, wherein:
the process of monitoring the abnormalities of the own system and the other system based on the plurality of abnormality information, and
the process of controlling the inverter circuit changes the control mode in accordance with the abnormality state determined by the process of monitoring the abnormality.

11. A rotary electric machine control device for controlling driving of a rotary electric machine, the rotary electric machine control device comprising:
a plurality of inverter circuits for switching over current supply to the rotary electric machine; and
a plurality of control circuits, each including a processor configured to execute a control process of controlling the inverter circuit and a monitor process of monitoring an abnormality, the control circuits being capable of mutual communication, wherein:
the plurality of inverter circuits and the plurality of control circuits are connected to form a plurality of systems in combination, respectively, one of the plurality of systems forming an own system and another one of the plurality of systems forming an other system;
the monitor process monitors abnormalities of the own system and the other system based on a plurality of abnormality information, and
the control process changes a control mode for the rotary electric machine in accordance with an abnormality state determined by the monitor process.

12. The rotary electric machine control device according to claim 11, wherein:
each of the plurality of systems includes a turn-off unit, which turns off the current supply to the rotary electric machine when an abnormality occurs in the own system, and an other system turn-off monitor unit monitor circuit which outputs an operation state of an other system turn-off unit of the other system; and
the abnormality information includes communication abnormality information related to a state of communication between the control circuits, and other system turn-off unit information related to the operation state of the other system turn-off unit.

13. The rotary electric machine control device according to claim 12, wherein:
the monitor process changes the control mode in accordance with a timing of occurrence of an abnormality in the communication between the control circuits and a timing of occurrence of an abnormality of the other system turn-off unit information.

14. The rotary electric machine control device according to claim 13, wherein:
the own system continues controlling the driving of the rotary electric machine and the other system stops controlling the driving of the rotary electric machine, when the abnormality of communication between the control circuits and the abnormality of the other system turn-off unit are detected at same time during the driving of the rotary electric machine; and
the driving of the rotary electric machine is stopped, when the abnormality of communication between control circuits and the abnormality of the other system turn-off unit are detected at different time during the driving of the rotary electric machine.

15. The rotary electric machine control device according to claim 12, wherein:
the rotary electric machine is driven by coordinated control by the plurality of systems using information shared by the plurality of control circuits, when the communication between the control circuits is normal and the other system turn-off unit is normal; and the rotary electric machine is driven by independent control by the plurality of systems without using information of the other system, when the communication between the control circuits is abnormal and the other system turn-off unit is normal.

16. The rotary electric machine control device according to claim 12, wherein:

the other system turn-off unit monitor circuit is determined to be abnormal, when the abnormality of the other system turn-off unit information is detected under a state that the communication between the control circuits is normal and the rotary electric machine is being driven by the other system using the information acquired by communication between the control circuits.

17. The rotary electric machine control device according to claim 12, wherein:

the other system turn-off unit monitor circuit is determined to be abnormal and the rotary electric machine is driven by the other system while prohibiting the control by the own system, when the other system turn-off unit information is abnormal at an initial checking executed before starting driving of the rotary electric machine.

18. The rotary electric machine control device according to claim 12, wherein:

the rotary electric machine is driven by independent control by the plurality of systems without using information of the other system, when the communication between the control circuits is abnormal at an initial checking executed before starting driving of the rotary electric machine.

* * * * *